United States Patent [19]
Araujo et al.

[11] Patent Number: 5,517,356
[45] Date of Patent: May 14, 1996

[54] GLASS POLARIZER FOR VISIBLE LIGHT

[75] Inventors: Roger J. Araujo, Horseheads; Nicholas F. Borrelli, Elmira; Josef C. Lapp; David W. Morgan, both of Corning, all of N.Y.

[73] Assignee: Corning Incorporated, Corning, N.Y.

[21] Appl. No.: 270,052

[22] Filed: Jul. 1, 1994

Related U.S. Application Data

[63] Continuation-in-part of Ser. No. 166,833, Dec. 15, 1993, Pat. No. 5,430,573.

[51] Int. Cl.$^6$ .................... G02B 5/30; G02B 27/28; C03C 3/11; C03C 10/16
[52] U.S. Cl. .................... 359/490; 359/492; 501/56
[58] Field of Search .................... 359/490, 491, 359/492; 65/33.3; 501/56

[56] References Cited

U.S. PATENT DOCUMENTS

| | | | |
|---|---|---|---|
| 3,325,299 | 6/1967 | Araujo | 106/52 |
| 3,540,793 | 11/1970 | Araujo et al. | 350/147 |
| 3,653,863 | 4/1972 | Araujo et al. | 65/30 |
| 3,954,485 | 5/1976 | Seward, III et al. | 106/47 Q |
| 4,304,584 | 12/1981 | Borrelli et al. | 65/30.11 |
| 4,339,256 | 7/1982 | Simms | 65/32 |
| 4,479,819 | 10/1984 | Borrelli et al. | 65/30.11 |
| 5,430,573 | 7/1995 | Araujo et al. | 359/490 |

FOREIGN PATENT DOCUMENTS 4-279337  9/1992  Japan.

Primary Examiner—Martin Lerner
Attorney, Agent, or Firm—Milton M. Peterson

[57] ABSTRACT

A glass article that is effective in polarizing radiation in the range of 400–700 nm and method of making, the glass having an $R_2O$—$Al_2O_3$—$B_2O_3$—$SiO_2$ base glass composition, a precipitated crystal phase consisting of a halide selected from the group composed of cuprous, cadmium and mixed cuprous-cadmium halides, the crystals in the crystal phase being elongated, and a portion of the crystals near the surface of the article being at least partially reduced to colloidal copper, whereby the article exhibits permanent dichroic behavior and has a polarization efficiency across the entire wavelength range of 400–700 nm of at least 0.80.

14 Claims, 1 Drawing Sheet

GLASS POLARIZER FOR VISIBLE LIGHT

This application is a Continuation-In-Part application of Ser. No. 08/166,833 filed Dec. 15, 1993, now U.S. Pat. No. 5,430,573 issued Jul. 4, 1995.

FIELD OF THE INVENTION

A polarizing glass article having a copper and/or cadmium halide crystal phase.

BACKGROUND OF THE INVENTION

U.S. Pat. No. 3,540,793 (Araujo et al.) discloses that photochromic glasses, based on silver halide crystals, can be rendered polarizing in the darkened state. This dual effect is accomplished by thermally softening and stretching the softened glass. This elongates the silver halide crystals and generates a form birefringent effect in the glass. When the glass is darkened, the anisotropy of the silver halide particles is manifested in an observed dichroism.

Subsequently, U.S. Pat. No. 4,304,584 (Borrelli et al.) reports that a permanent polarizing effect can be obtained. This is accomplished by heat treating the stretched glass in a reducing atmosphere to chemically reduce the elongated silver halide crystals to elongated particles of metallic silver.

Still later, it was learned that the polarizing effect could be extended to the infra-red portion of the spectrum. This is reported in U.S. Pat. No. 4,479,819 (Borrelli et al.).

Glass polarizers, produced from silver halide-containing glasses as just described, have enjoyed commercial success in applications employing radiation in the infra-red portion of the spectrum. However, the parallel and perpendicular absorption curves reverse in magnitude and cross over in the visible wavelength region at about 480 nm. This has prevented the silver halide glasses from being considered for use as a visible polarizer, that is, for applications that require polarization in the same direction across the entire visible wavelength region of the spectrum. As used in this application, the term "visible polarizer" means a polarizer that provides effective polarization of radiation across the entire visible wavelength region of the spectrum. This is essentially the wavelength range of 400–700 nm.

U.S. Pat. No. 3,325,299 (Araujo) discloses phototropic (now known as photochromic) glasses in which copper and/or cadmium halide crystals are precipitated to impart photochromic behavior. The disclosed glasses have $R_2O$—$Al_2O_3$—$B_2O_3$—$SiO_2$ base compositions. These oxides total at least 85% of the glass composition. Copper and/or cadmium oxides, together with sufficient chlorine, bromine and/or iodine to react stoichiometrically with at least 0.3% copper and/or cadmium, are added to the base glass composition.

U.S. Pat. No. 5,281,562 (Araujo et al.) is directed to a family of glasses which also contain a cuprous and/or cadmium halide crystal phase, and which are strongly absorbing in the ultraviolet region of the radiation spectrum. They have a sharp spectral cut-off of shorter wavelengths at about 400 nm. However, they are non-photochromic, and may be essentially colorless.

The application explains that cadmium is not required to secure absorption of ultraviolet radiation, and imparts no exceptional benefit to the glass. The halide crystals are effective to absorb ultraviolet radiation, but cadmium is known to be extremely toxic. Accordingly, its presence is severely restricted, and it is preferably completely avoided. Therefore, while cadmium halide glasses are within the scope of the present invention, reference throughout will be to copper halide glasses.

It has been found that the copper and cadmium halide photochromic glasses disclosed in U.S. Pat. No. 3,325,299 can also be rendered polarizing in the darkened state. The glass is thermally softened and stretched, or otherwise elongated. This action elongates the halide crystals and is described in detail in U.S. Pat. No. 3,954,485 (Seward III, et al.).

Japanese Published Application S.N. 4-279,337 discloses glasses that may be a silicate, a borate, or a borosilicate, and that may have copper halide crystals formed within the glass. The application further discloses that such glasses may be rendered polarizing in the infra-red for telecommunication purposes. This is accomplished in the same manner as in the silver halide crystal-containing glasses noted above. That is, the glass is stretched to elongate the crystals, and fired in hydrogen to at least partially reduce the copper halide to metallic copper.

Heretofore, polarizers useful in the visible wavelength region of the spectrum, that is, 400–700 nm, have been produced from plastic materials. The disadvantages of such materials are well known. They cannot withstand elevated temperatures, scratch easily, bleach under intense light, and may undergo distortion under pressure.

The present invention provides a glass polarizer that is effective throughout the entire visible wavelength portion of the spectrum. The glass polarizer has a sharp cutoff in transmission at about 400 nm, which removes harmful ultraviolet rays. This is of particular value in LCD displays to protect the color filter. The invention further provides a method of producing such a glass polarizer from glasses containing copper halide crystals.

SUMMARY OF THE INVENTION

The product of the invention is a glass polarizer that provides effective polarization of radiation across the entire visible wavelength region of the spectrum, the glass having an $R_2O$—$Al_2O_3$—$B_2O_3$—$SiO_2$ base composition, a precipitated crystal phase consisting of a halide selected from the group consisting of cuprous, cadmium and mixed cuprous-cadmium halides, the volume fraction of the crystals being greater than 0.003, the crystals in the crystal phase being elongated and oriented, and at least a portion of the crystals near the surface of the article being at least partially reduced to metallic copper, whereby the article exhibits permanent dichroic behavior and has an average polarization efficiency across the entire 400–700 nm wavelength range of at least 0.80.

The invention further resides in a method of producing a glass polarizer that is effective to polarize light radiation across the entire visible wavelength region of the spectrum which comprises the steps of melting a batch for a $R_2O$—$Al_2O_3$—$B_2O_3$—$SiO_2$ base glass containing at least 0.2% by weight $Cu_2O$ together with a sufficient amount of at least one halogen selected from the group consisting of chlorine and bromine to react with at least 0.2% copper, precipitating a cuprous halide crystal phase in the glass in an amount that constitutes over 0.003 volume fraction of the glass, subjecting the glass to a stress in one direction of at least 17.25 Mpa (2500 psi) to elongate the glass and the cuprous halide crystals therein, and then exposing the glass to a reducing atmosphere to reduce at least a portion of the copper halide crystallites in a thin layer near the surface of the glass to impart an average polarizing efficiency across the entire 400–700 nm wavelength range of at least 0.80.

PRIOR ART

Figure 1:
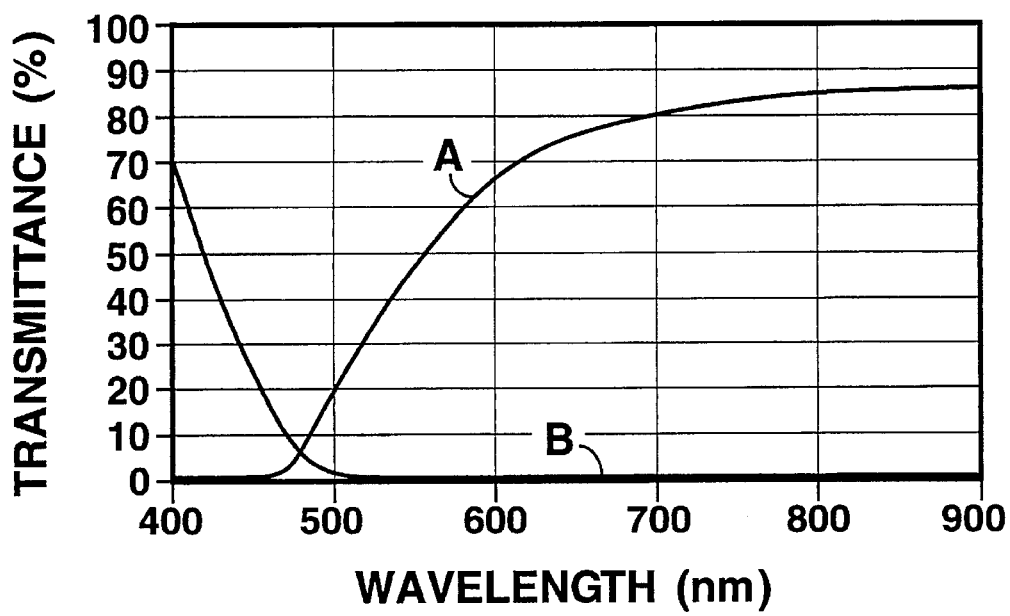
FIGS. 1 and 2 in the drawing are graphical representations of transmission curves for (1) light polarized by an article in accordance with the prior art and (2) light polarized by an article in accordance with the invention.

The art known to applicant and considered to be most relevant has been described in the Background section.

DESCRIPTION OF THE INVENTION

The polarizer of the present invention may be produced from any $R_2O$—$Al_2O_3$—$B_2O_3$—$SiO_2$ base glass in which a sufficient volume of copper halide crystals can be precipitated. This includes the photochromic glasses disclosed in U.S. Pat. No. 3,325,299 and the non-photochromic glasses disclosed in U.S. Pat. No. 5,281,562. For most purposes, it is desirable to avoid color, particularly a potentially variable color. Hence, a colorless, non-photochromic glass is generally preferred.

The invention arose during investigation of glasses having a copper halide crystal phase precipitated within the glass. The invention is based on discovery that unique polarizing effects over the entire visible wavelength range of 400–700 nm can be achieved in such glasses. These effects are achieved by a thermal reduction treatment after elongation of the crystallites.

It had previously been observed that photochromic glasses, based on copper and cadmium halides, could be rendered polarizing in the darkened state. This was accomplished by placing a bar of glass under uni-directional stress at an elevated temperature. This elongated the glass bar, and, consequently, the halide crystallites contained therein.

The present investigation was undertaken to determine whether the copper halide glasses could be rendered permanently polarized in the same direction across the entire visible wavelength region (400–700 nm). More particularly, the investigation was directed at determining whether a permanent visible wavelength polarizing effect could be achieved by exposing a stretched glass to a thermal reduction treatment.

It was found that cuprous halide crystallites in a thin surface layer could be reduced, at least in part, to copper metal by a thermal reduction treatment. The term "thermal reduction" refers to a chemical reduction of a copper ion to the metallic state in a cuprous halide crystallite in glass while the glass is heated at an elevated temperature.

In silver halide glasses, it is desirable to conduct the thermal reduction at a temperature above 400° C. to maximize the polarizing behavior. This condition is also found to be desirable with the present copper halide glasses, although temperatures as low as 350° C. may suffice. While any reducing atmosphere may be employed, we prefer to employ hydrogen. This achieves the desired degree and depth of reduction in a reasonable time.

Quite unexpectedly, however, it was found that light polarized by a copper halide glass differed in a very significant aspect from light polarized by a stretched silver halide glass. The difference is in the transmittance curves for the parallel polarized light and the perpendicularly polarized light in the two systems.

In the silver halide system, transmittances measured parallel to the stretch axis are less than those measured perpendicular to that axis at long wavelengths. However, they are higher at shorter wavelengths below about 480 nm.

This is illustrated in FIG. 1 of the accompanying drawing. In that figure, transmittance values are plotted in percent on the vertical axis. Wavelengths are plotted on the horizontal axis in nm.

The data plotted in FIG. 1 were measured on a glass bar containing silver halide crystals. The glass bar was heat treated for 75 minutes at 725° C. to develop the silver halide crystal phase, and then stretched to elongate the crystals. The stretched bar was then fired in hydrogen for 48 hours at 410° C. This partially reduced the silver halide crystals in a surface layer to metallic silver, thereby rendering the glass polarizing.

This practice is in accordance with that described in U.S. Pat. Nos. 4,304,584 and 4,479,819, noted earlier. Accordingly, those patents are incorporated by reference to the extent necessary for comparative purposes.

The curve labeled A represents transmittance values for light polarized parallel to the stretch axis of the glass. This is the axis of the stretched silver halide crystals. The curve labeled B represents transmittance values for light polarized perpendicular to the stretch axis.

It will be observed that curves A and B cross at about 480 nm. This feature renders the silver halide glasses unsatisfactory for producing a light polarizer that is effective across the entire range of 400–700 nm.

Figure 2:
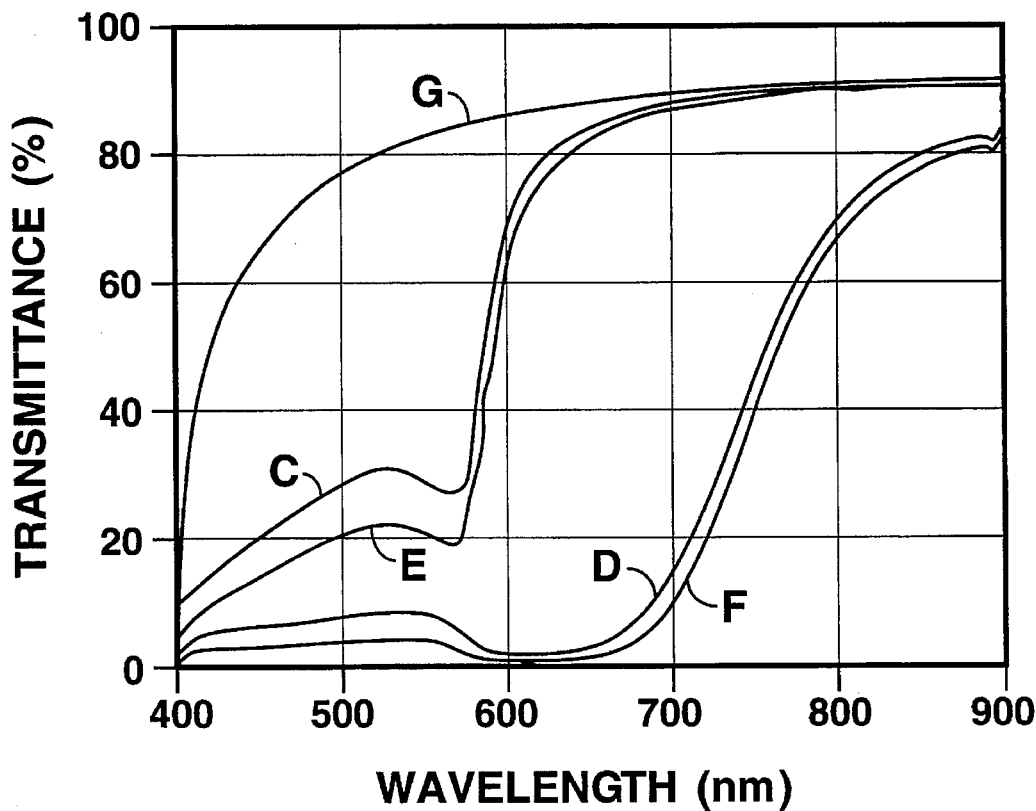

FIG. 2 in the drawing is also a graphical representation of transmittance curves for polarized light. As in FIG. 1, transmittance values are plotted in percent along the vertical axis. Wavelengths from 400–900 nanometers (nm) are plotted along the horizontal axis.

FIG. 2 exhibits the transmittance curves for light polarized by a typical copper halide crystal-containing glass in accordance with the present invention. Two molded glass bars were heat treated at 700° C. to develop a copper halide crystal phase. A stress of 20.7 Mpa (3000 psi) was applied to stretch the glass bars to a thickness of about 0.8 mm. The crystals also were elongated in the process. The bars were fired at 410° C. in a hydrogen atmosphere. One bar was fired for 2.5 hours; the other for 4.5 hours. These treatments at least partially reduced copper halide crystals in a surface layer to metallic copper.

In FIG. 2, Curves C and D are based on measurements made on the bar fired for 2.5 hours. Curves E and F are based on measurements made on the bar fired for 4.5 hours. Curve G is the transmittance curve for the glass before firing in hydrogen. Measurements were made on a Hitachi U4001 spectrophotometer.

In FIG. 2, Curves C and E are the transmittance curves for visible light polarized perpendicular to the axis of the stretched crystals. Curves D and F are the transmittance curves for light polarized parallel to the axis of the stretched crystals.

It will be observed that curves C and E do not cross their respective counterparts D and F at any point. This means that transmittance values for light polarized parallel are less than those for light polarized perpendicular at all wavelengths across the visible and near infra-red portions of the spectrum. This is a key distinction between glasses that contain copper halide or silver halide crystals and that have been stretched and reduced to become polarizing. It is due, in part, to the fact that the interband absorption contribution to the optical dielectric constants is negligible for silver, but makes an important contribution to the optical constants of copper below 500 nm.

Observation of this unique feature of the copper chloride glasses led to the concept of producing a glass polarizer having the properties necessary for use with visible light across the entire 400–700 nm region.

A further interesting feature of glasses containing copper chloride crystals is their sharp cutoff for transmission of radiation at wavelengths below 400 nm. This means that ultra-violet radiation is essentially completely absorbed. This feature, together with the polarizing capability in the 400–700 nm region, makes the glass particularly useful in a polarizer for an LCD display. Heretofore, only plastic polarizers were available for such use.

Certain conditions are essential, in either a photochromic or non-photochromic type glass, to produce a cuprous halide crystal phase. The base glass must be an $R_2O$—$Al_2O_3$—$B_2O_3$—$SiO_2$ glass. In addition, it is necessary to provide, in the glass batch, a source of copper, as well as a source of halogen selected from chlorine, bromine, and iodine. To produce the present polarizing glass, the following additives, in weight percent based on the glass, are considered desirable: 0.4–1.0% CuO, 0.5–1.0% SnO, and a halogen selected from the group consisting of 0.25–1.0% Cl, 0.25–1.0% Br and 0.25–1.5% Cl+Br.

The crystal phase may be precipitated in the glass as a formed article is cooled. However, it is generally desirable to cool the glass rapidly, thereby avoiding crystal development. Then, the glass may be reheated to precipitate the cuprous halide crystal phase. To this end, the glass is heated above its strain point, but below about 900° C. Generally a temperature in the range of 650°–850° C. is preferred for this purpose, although temperatures in the range of 500°– 900° C. are contemplated.

To provide cuprous halide crystals in the glass, the glass composition requires at least 0.2 weight percent cuprous oxide ($Cu_2O$), preferably at least 0.4%. Up to about 2% $Cu_2O$ may be employed, but cuprous ions tend to disproportionate into cupric ions and neutral atoms at such higher levels. Therefore, the preferred maximum $Cu_2O$ content is about 1.0% by weight. The cuprous ion imparts no visible color to the glass, whereas the cupric ion generally provides a blue-green color.

The oxidation state of the copper is influenced by the temperature at which the glass batch is melted, by the partial pressure of oxygen to which the molten batch is exposed, by the concentration of polyvalent ions in the glass, and by the basicity (the R-value) of the glass. The oxides of arsenic, antimony and tin are illustrative of polyvalent metal oxides that are especially useful since they do not directly impart color to the glass.

Chlorine or bromine must be present to combine with the copper to form the necessary cuprous halide crystal phase. Iodine is also effective, but is not normally employed. The inclusion of fluorine may be useful, but it does not produce cuprous halide crystals in the absence of chlorine or bromine.

A particularly significant control factor is the R-value, a measure of the basicity of a glass. This value is expressed in cation % on an oxide basis as calculated from the formula:

$$R = \frac{M_2O + 2MO - Al_2O_3 - ZrO_2}{B_2O_3}$$

$M_2O$ designates alkali metal oxides, and MO represents alkaline earth metal oxides. Cuprous halide crystals can be developed in glasses with R-values below 0.15. Nevertheless, the development is slow, there is no substantial advantage in these glasses, they tend to be difficult to melt and they have poor chemical durability. Glasses with an R-value greater than 0.30 do not provide the desired crystal phase, except under certain compositional conditions. Glasses with a value over 0.45 are not suitable under any condition. Glasses with an R-value of about 0.25 are generally optimal for the development of a cuprous halide crystal phase.

TABLE I, below, sets forth, in terms of oxides and halogens, the approximate ranges, in weight percent, for compositions for glasses in which cuprous chloride crystals can be precipitated in the glass. The first column identifies the composition components; the second column, the ranges for non-photochromic (Non-PC) glasses; the third column, ranges for all glasses within the scope of the present invention (Cons.).

TABLE I

| Comp. | Non-PC | Cons. |
|---|---|---|
| $SiO_2$ | 48–80 | 40–80 |
| $B_2O_3$ | 10–35 | 4–35 |
| $Al_2O_3$ | 0–12 | 0–26 |
| $Li_2O$ | 0–4 | 0–8 |
| $Na_2O$ | 0–14 | 0–15 |
| $K_2O$ | 0–12 | 0–20 |
| $Li_2O+Na_2O+K_2O$ | 4–15 | 2–20 |
| CaO+BaO+SrO | 0–10 | 0–10 |
| $Cu_2O$ | 0.2–1.6 | 0.2–2 |
| CdO | 0–2 | 0–2 |
| $ZrO_2$ | 0–12 | 0–12 |
| $SnO_2$ | 0–2.5 | 0–2.5 |
| $As_2O_3+Sb_2O_3$ | 0–2 | 0–2 |
| Cl | 0–1.75 | 0–2 |
| Br | 0–1.0 | 0–2 |
| Cl+Br | 0.25–2.0 | 0.25–2.0 |
| F | 0–2 | 0–2 |
| R-value | 0.15–0.45 | 0.15–0.45 |

TABLE II sets forth some typical photochromic glass compositions in terms of oxides and halogens. These compositions are calculated from the glass batch in parts by weight approximating 100. It will be appreciated that up to 25% of the copper, and up to as much as 60% of the halogen content, may be lost during melting of the batch.

TABLE II

| | 1 | 2 | 3 | 4 | 5 | 6 |
|---|---|---|---|---|---|---|
| $SiO_2$ | 58.3 | 55.2 | 58.4 | 57.7 | 59.2 | 59.5 |
| $Al_2O_3$ | 9.0 | 12.0 | 9.0 | 9.0 | 9.5 | 11.4 |
| $B_2O_3$ | 20.0 | 20.0 | 20.0 | 20.0 | 20.1 | 17.4 |
| $Na_2O$ | 10.1 | 10.0 | 10.0 | 10.0 | 4.4 | 5.7 |
| F | 1.4 | 0.7 | 1.2 | 1.5 | — | — |
| Cl | 0.9 | — | 0.9 | 0.9 | 0.5 | 0.5 |
| Br | — | 1.5 | — | — | 0.5 | 0.5 |
| Cu | 0.5 | 0.3 | 0.5 | 0.9 | 0.4 | 0.58 |
| Cd | — | 0.3 | — | — | — | — |
| $Li_2O$ | — | — | — | — | 1.9 | 2.0 |
| $K_2O$ | — | — | — | — | 2.9 | 1.5 |
| $SnO_2$ | — | — | — | — | 0.5 | 0.66 |

TABLE III sets forth several typical compositions for non-photochromic glasses. The compositions are presented in terms of oxides and halogen contents as calculated from the batch in parts by weight approximating 100. Again, analyses will show substantially lower copper and halogen contents.

All of the compositions shown in TABLES II and III represent glasses suitable for producing articles in accordance within the present invention.

TABLE III

|  | 7 | 8 | 9 | 10 | 11 | 12 |
| --- | --- | --- | --- | --- | --- | --- |
| $SiO_2$ | 56.6 | 52.6 | 77.5 | 56.5 | 55.8 | 72.8 |
| $Al_2O_3$ | 8.5 | 4.4 | 1.9 | 9.4 | 8.4 | 0.3 |
| $B_2O_3$ | 25.3 | 17.7 | 13.6 | 19.0 | 24.9 | 21.2 |
| $Li_2O$ | 4.0 | 1.0 | — | 1.1 | 2.6 | 0.4 |
| $Na_2O$ | 3.6 | 7.8 | 3.9 | 8.5 | 6.3 | 1.2 |
| $K_2O$ | — | 1.3 | — | 1.5 | — | 1.4 |
| $ZrO_2$ | — | 10.6 | — | — | — | — |
| $SnO_2$ | 0.6 | 1.0 | 0.5 | 0.9 | 0.6 | 0.6 |
| CuO | 0.4 | 0.8 | 0.5 | 0.8 | 0.4 | 0.5 |
| Cl | 0.6 | 0.6 | 0.9 | 0.3 | 0.6 | 1.0 |
| Br | 0.4 | 0.4 | 0.5 | 0.3 | 0.4 | 0.7 |
| F | — | 1.8 | 0.8 | 1.8 | — | — |

A glass batch was formulated on the basis of composition 5 using standard glass-making materials including sand, alumina, oxides, carbonates and halides. The batch was ballmilled to ensure homogeneity, and melted in a covered crucible. A 22 Kg (10 lb.) batch for this glass was formulated, mixed and melted for 6 hours at 1450° C. For test purposes, bars having dimensions of 6.25×1.25×70 cms. (2.5"×0.5"×28") were poured from the melt into molds.

A bar cast from the melt was selected for further treatment. The bar was heat treated for 75 minutes at the glass softening point to form the requisite crystal phase. The bar was then heat treated at 700° C. and stretched under a stress of 20.7 MPa (3000 psi) at that temperature.

The stretched bar was then fired in a hydrogen atmosphere at 380° C. for two hours. Transmittance measurements were then made on the sample using a Hitachi U4001 spectrophotometer.

TABLE IV shows transmittance values measured at three different wavelengths (nm). Measurements were made on light polarized perpendicular to the stretch axis (T 1) and on light polarized parallel to the axis (T 11).

TABLE IV

| Wavelength | T (%) 1 | T (%) 11 |
| --- | --- | --- |
| 610 | 72.6 | 5.6 |
| 560 | 40.0 | 18.3 |
| 500 | 35.0 | 10.0 |
| 460 | 25.7 | 9.0 |

These measurements demonstrated the feasibility of the present invention. However, the values were not sufficient for useful purposes. Accordingly, further study was initiated to seek improvements.

In particular, two standards are recognized in the polarizing art. Both are based on transmittance values measured on parallel and perpendicular polarized light components. One standard is referred to as "efficiency" and is defined as:

$$\frac{T \max - T \min}{T \max + T \min}$$

The other is an average value defined as:

$$\frac{T \max + T \min}{2}$$

In each case, T max refers to the larger transmittance of the perpendicular component, and T min refers to the lesser transmittance of the parallel component. Integrated values over a wavelength range, for example 400–700 nm, are most meaningful. However, for convenience, it is frequently adequate to employ transmittance values measured at a given wavelength, e.g., 500 nm. In any case, the largest value available is desired.

Further studies were made on a glass having the composition of Example 6 in TABLE II. The base glass composition was altered somewhat, and the copper and tin oxide additions were increased with respect to Example 5.

The glass was batched, melted and poured to form bars as before. The bars were heat treated for one hour in two separate sets, one set at 700° C. and the other at 725° C., to develop copper halide crystals. The volume fraction of copper halide crystals was calculated to be 0.0058.

Each set of test bars was further split into subsets for treatment by stretching under stress and by firing in a hydrogen atmosphere. The stretching was at 20.7 and 34.5 Mpa (3000 and 5000 psi). The firing was at 415° C. for 2.5 and 4.5 hours. Transmittances were measured and values at 500 nm recorded.

TABLE V lists the recorded values and the calculated efficiencies, all at 500 nm. Column one records, under the heading HT/Stress, the temperature (in °C.) of the heat treatment to develop crystals, and the stress (in MPa) under which the bars were stretched. Column two records, under the heading Tmax/Tmin, the transmittances measured at 500 nm for bars fired in hydrogen at 415° C. for 2.5 hours. Column three shows the efficiency (under E) calculated as shown earlier. Columns four and five likewise show the transmittances and efficiencies for the bars fired in hydrogen for 4.5 hours at 415° C.

TABLE V

| HT/Stress | Tmax/Tmin 2.5 hrs. | E | Tmax/Tmin 4.5 hrs. | E |
| --- | --- | --- | --- | --- |
| 725/20.7 | 44/7.3 | 0.73 | 36/4 | 0.80 |
| 725/34.5 | 34/4.5 | 0.77 | 27/3 | 0.80 |
| 700/20.7 | 28/4 | 0.75 | 20/2.2 | 0.80 |
| 700/34.5 | 38/4 | 0.81 | 30/2.3 | 0.85 |

These data indicate that efficiency is increased by longer firing in $H_2$ and by increased stress applied during stretching. Also, as shown earlier, an increase in volume fraction of the crystal content is significant. Accordingly, we prefer to have an efficiency of at least 0.80, a volume fraction of copper halide crystals of over 0.005, and to stretch the glass at a stress over 20.7 Mpa (3000 psi).

We claim:

1. A glass polarizer that provides effective polarization of radiation across the entire visible wavelength region of the spectrum, the glass having an $R_2O$—$Al_2O_3$—$B_2O_3$—$SiO_2$ base composition, a precipitated crystal phase consisting of a halide selected from the group consisting of cuprous, cadmium and mixed cuprous-cadmium halides, the volume fraction of the crystals being greater than 0.003, the crystals in the crystal phase being elongated and oriented, and at least a portion of the crystals near the surface of the article being at least partially reduced to metallic copper, whereby the article exhibits permanent dichroic behavior and polarization capability across the entire 400–700 nm wavelength range, the efficiency of the polarization, calculated on the basis of a standard defined by the formula, $$\frac{T \max - T \min}{T \max + T \min}$$

wherein T max is the transmittance of the perpendicular component of polarized light and T min is transmittance of the parallel component and employing transmittance measurements at a wavelength of 500 nm being at least 0.80.

2. A glass polarizer in accordance with claim 1 wherein the glass composition includes 0.2–2.0 weight percent copper calculated as $Cu_2O$ and 0.25–1.5% of a halogen selected from the group consisting of bromine, chlorine and mixtures thereof.

3. A glass polarizer in accordance with claim 2 wherein the glass composition includes 0.4–1.0% $Cu_2O$, 0.4–1.0% SnO and 0.25–1.5% of a halogen selected from the group consisting of 0.25–1.0% Cl, 0–1.0% Br and 0.25–1.5% of mixtures.

4. A glass polarizer in accordance with claim 1 wherein the glass composition consists essentially of, as calculated from the glass batch in weight percent on an oxide and halogen basis; 40–80% $SiO_2$, 4–35% $B_2O_3$, 0–26% $Al_2O_3$, 0–8% $Li_2O$, 0–15% $Na_2O$, 0–20% $K_2O$, the total $Li_2O+Na_2O+K_2O$ being 2–20%, 0–10% CaO+BaO+SrO, 0.2–2% $Cu_2O$, 0–2% CdO, 0–12% $ZrO_2$, 0–2.5% $SnO_2$, 0–2% $As_2O_3+Sb_2O_3$, 0–2% Cl, 0–2% Br, 0.25–2.0% Cl+Br, 0–2% F, with an R-value in the range of 0.15–0.45.

5. A glass polarizer in accordance with claim 1 wherein the glass is a non-photochromic glass.

6. A glass polarizer in accordance with claim 1 wherein the volume fraction of the crystals is greater than 0.005.

7. A glass polarizer in accordance with claim 1 wherein the glass has a sharp cutoff for radiation at wavelengths below 400 nm.

8. A glass polarizer in accordance with claim 1 wherein the crystal phase is cuprous halide crystals.

9. A method of producing a glass polarizer that is effective to polarize light radiation across the entire visible wavelength region of the spectrum which comprises the steps of melting a batch for a $R_2O$—$Al_2O_3$—$B_2O_3$—$SiO_2$ base glass containing at least 0.2% by weight $Cu_2O$ together with a sufficient amount of at least one halogen selected from the group consisting of chlorine and bromine to react with at least 0.2% copper, precipitating a cuprous halide crystal phase in the glass in an amount that constitutes over 0.003 volume fraction of the glass, subjecting the glass to a stress in one direction of at least 17.25 Mpa (2500 psi) to elongate the glass and the cuprous halide crystals therein, and then exposing the glass to a reducing atmosphere to reduce at least a portion of the copper halide crystals in a thin layer near the surface of the glass to impart permanent dichroic behavior and polarizing capability across the entire 400–700 nm wavelength range the efficiency of the polarizing capability, calculated on the basis of a standard defined by the formula, $$\frac{T\max - T\min}{T\max + T\min}$$

wherein T max is the transmittance of the perpendicular component of polarized light T min is the transmittance of the parallel component and employing transmittance measurements at a wavelength of 500 nm, being at least 0.80.

10. A method in accordance with claim 9 which further comprises cooling the molten glass while avoiding crystal formation, and thereafter reheating the glass to thermally precipitate cuprous halide crystals.

11. A method in accordance with claim 10 wherein the glass is reheated to a temperature in the range of 650°–850° C.

12. A method in accordance with claim 11 wherein the glass is exposed to a reducing atmosphere at a temperature of at least about 400° C.

13. A method in accordance with claim 11 wherein the reducing atmosphere is hydrogen.

14. A method in accordance with claim 9 which comprises subjecting the glass to a stress of at least 20.7 Mpa (3000 psi) to elongate the glass and the crystals.

* * * * *